United States Patent
Priyadarsini et al.

(10) Patent No.: US 10,699,159 B2
(45) Date of Patent: Jun. 30, 2020

(54) OBJECTS AGGREGATION AND STANDARDIZATION FOR LEGACY GRAPHICS CONVERSION

(71) Applicant: Honeywell International Inc., Morris Plains, NJ (US)

(72) Inventors: Prangya Priyadarsini, Karnataka (IN); Rakshitha Prabhu, Karnataka (IN); Prasad Kamath, Karnataka (IN); Ramakrishnan Ganapathi, Karnataka (IN)

(73) Assignee: Honeywell International Inc., Morris Plains, NJ (US)

(*) Notice: Subject to any disclaimer, the term of this patent is extended or adjusted under 35 U.S.C. 154(b) by 35 days.

(21) Appl. No.: 16/104,708

(22) Filed: Aug. 17, 2018

(65) Prior Publication Data
US 2020/0057909 A1  Feb. 20, 2020

(51) Int. Cl.
G06K 9/62 (2006.01)
G06K 9/32 (2006.01)
G06T 11/20 (2006.01)
G06F 16/51 (2019.01)
G06F 16/11 (2019.01)

(52) U.S. Cl.
CPC ............ G06K 9/622 (2013.01); G06F 16/119 (2019.01); G06F 16/51 (2019.01); G06K 9/3216 (2013.01); G06T 11/203 (2013.01); *G06K 2209/19* (2013.01); *G06T 2210/22* (2013.01)

(58) Field of Classification Search
CPC ... G06T 11/20; G06T 11/203; G06T 2210/32; G06F 16/116; G06F 16/1794; G06F 16/258
See application file for complete search history.

(56) References Cited

U.S. PATENT DOCUMENTS

| 5,255,354 | A | 10/1993 | Mahoney |
| 5,404,411 | A | 4/1995 | Banton et al. |
| 5,568,568 | A | 10/1996 | Takizawa et al. |
| 6,088,483 | A | 7/2000 | Nakano et al. |

(Continued)

FOREIGN PATENT DOCUMENTS

| CN | 105512425 A | 4/2016 |
| EP | 0156343 A2 | 10/1985 |

(Continued)

OTHER PUBLICATIONS

Ganapathi et al., "System and Method for Translation of Graphics to Newer Format Using Pattern Matching", U.S. Appl. No. 15/953,072, filed Apr. 13, 2018, 32 pages.

*Primary Examiner* — Jeffery A Brier

(57) ABSTRACT

A method includes receiving a plurality of legacy graphics files associated with a control system for an industrial process, each legacy graphics file comprising a plurality of legacy graphics objects. The method also includes parsing the legacy graphics files to identify primitive graphic objects in each legacy graphics file. The method also includes determining relationships among the identified primitive graphic objects to determine a group of primitive graphic objects that form one component of the industrial process. The method also includes determining one or more patterns among the identified primitive graphic objects. The method also includes saving the one or more patterns in a pattern library.

18 Claims, 9 Drawing Sheets

(56) References Cited

U.S. PATENT DOCUMENTS

| | | | |
|---|---|---|---|
| 6,195,664 B1* | 2/2001 | Tolfa | G06F 16/116 707/758 |
| 7,151,854 B2 | 12/2006 | Shen et al. | |
| 7,502,519 B2 | 3/2009 | Eichhorn et al. | |
| 7,593,780 B2 | 9/2009 | Mann et al. | |
| 7,653,238 B2 | 1/2010 | Stentiford | |
| 8,229,579 B2 | 7/2012 | Eldridge et al. | |
| 8,447,076 B2 | 5/2013 | Yamamoto et al. | |
| 8,516,383 B2 | 8/2013 | Bryant et al. | |
| 8,629,877 B2 | 1/2014 | Bakalash et al. | |
| 9,256,472 B2 | 2/2016 | Kakade et al. | |
| 9,342,859 B2 | 5/2016 | Ayanam et al. | |
| 9,547,291 B2 | 1/2017 | Tran et al. | |
| 9,551,986 B2 | 1/2017 | Lo | |
| 2002/0085020 A1 | 7/2002 | Carroll, Jr. | |
| 2002/0152245 A1* | 10/2002 | McCaskey | G06F 16/958 715/234 |
| 2002/0191848 A1* | 12/2002 | Boose | G06K 9/00476 382/181 |
| 2002/0194190 A1* | 12/2002 | Shema | G06F 16/94 |
| 2005/0154558 A1* | 7/2005 | Baum | G06F 17/509 702/182 |
| 2008/0189637 A1 | 8/2008 | Krajewski et al. | |
| 2008/0189638 A1 | 8/2008 | Mody et al. | |
| 2009/0153528 A1 | 6/2009 | Orr | |
| 2010/0309212 A1* | 12/2010 | Muir | G06F 9/454 345/545 |
| 2015/0105876 A1 | 4/2015 | Tran et al. | |
| 2015/0105893 A1 | 4/2015 | Tran et al. | |
| 2015/0277404 A1 | 10/2015 | Maturana et al. | |

FOREIGN PATENT DOCUMENTS

| | | |
|---|---|---|
| EP | 0717866 B1 | 11/1997 |
| WO | 03/001343 A2 | 1/2003 |
| WO | 03/023711 A2 | 3/2003 |

* cited by examiner

| SOURCE PATTERN | PATTERN CATEGORY | HMI SHAPE PATH | HMI SHAPE |
|---|---|---|---|
| | RIGHT VALVE | \..\..\..\..\v.sha | |
| | RIGHT BLOWER | \..\..\..\..\b.sha | |
| | VERTICAL TANK | \..\..\..\..\vt.sha | |
| | HORIZONTAL TANK | \..\..\..\..\ht.sha | |
| FRRRRRR | TAG BOX | \..\..\..\..\t1.sha | {% 9999.99 |
| RRRRRR TC-4300 RRRRRR | TAG BOX | \..\..\..\..\t2.sha | W 9999.99 * 9999.99 9999.99 |

OBJECTS AGGREGATION AND STANDARDIZATION FOR LEGACY GRAPHICS CONVERSION

TECHNICAL FIELD

This disclosure relates generally to industrial process control and automation systems. More specifically, this disclosure relates to a system and method for objects aggregation and standardization for legacy graphics conversion.

BACKGROUND

Industrial process control and automation systems are often used to automate large and complex industrial processes. These types of systems routinely include sensors, actuators, and controllers. Some of the controllers typically receive measurements from the sensors and generate control signals for the actuators. Other controllers often perform higher-level functions, such as planning, scheduling, and optimization operations. A distributed control system (DCS) is often implemented in conjunction with or as part of an industrial process control and automation system. Such DCS systems include applications with graphical displays for a user to observe and control components and processes of the industrial process control and automation system.

SUMMARY

This disclosure provides a system and method for objects aggregation and standardization for legacy graphics conversion.

In a first embodiment, a method includes receiving a plurality of legacy graphics files associated with a control system for an industrial process, each legacy graphics file comprising a plurality of legacy graphics objects. The method also includes parsing the legacy graphics files to identify primitive graphic objects in each legacy graphics file. The method also includes determining relationships among the identified primitive graphic objects to determine a group of primitive graphic objects that form one component of the industrial process. The method also includes determining one or more patterns among the identified primitive graphic objects. The method also includes saving the one or more patterns in a pattern library.

In a second embodiment, an apparatus includes at least one processing device configured to receive a plurality of legacy graphics files associated with a control system for an industrial process, each legacy graphics file comprising a plurality of legacy graphics objects; parse the legacy graphics files to identify primitive graphic objects in each legacy graphics file; determine relationships among the identified primitive graphic objects to determine a group of primitive graphic objects that form one component of the industrial process; determine one or more patterns among the identified primitive graphic objects; and save the one or more patterns in a pattern library.

In a third embodiment, a non-transitory computer readable medium contains instructions that when executed cause at least one processing device to receive a plurality of legacy graphics files associated with a control system for an industrial process, each legacy graphics file comprising a plurality of legacy graphics objects; parse the legacy graphics files to identify primitive graphic objects in each legacy graphics file; determine relationships among the identified primitive graphic objects to determine a group of primitive graphic objects that form one component of the industrial process; determine one or more patterns among the identified primitive graphic objects; and save the one or more patterns in a pattern library.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
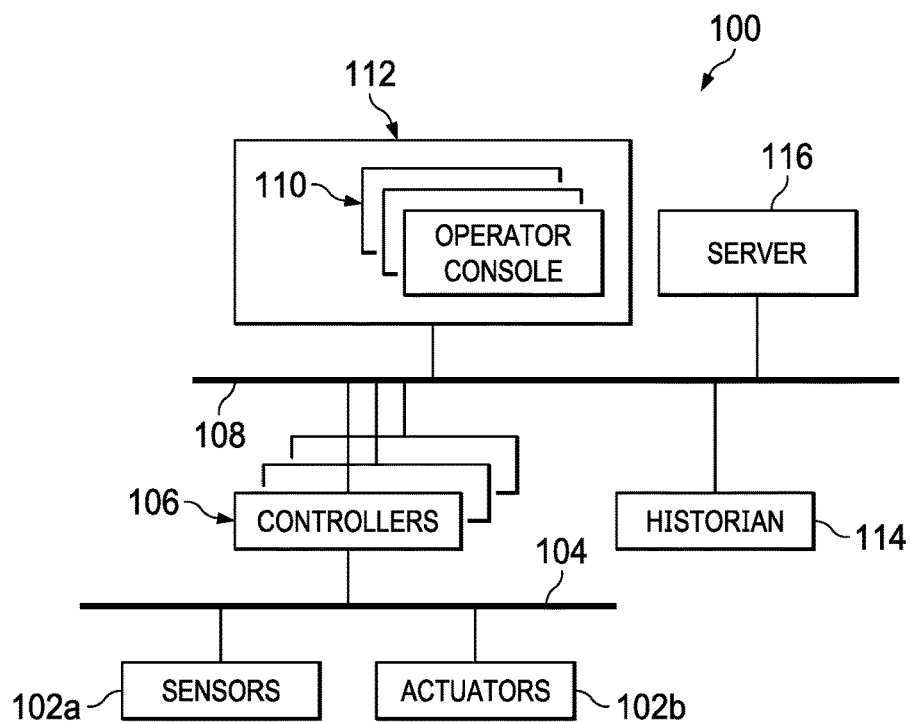
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and alarms associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100. Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system.

In order to provide system status, various components of the system 100 (e.g., the sensors 102a, actuators 102b, and controllers 106) can be represented graphically on a display of one or more operator consoles 110. In many cases, each component is displayed as a preconfigured or custom graphic that is unique for that component or type of component. For example, when an actuator 102b is a valve, the valve can be displayed as a graphic that has the appearance of a valve. When a sensor 102a is a temperature gauge, the temperature gauge can be displayed as a graphic that has the appearance of a temperature gauge.

Generally, each control system or version of control system has a library of graphics associated with that system or version. When it is time for a migration to a new control system or version (e.g., due to obsolescence of the legacy system), the graphics representing the system components typically are migrated as well. For example, for a migration to a new DCS (distributed control system) solution (such as EXPERION by HONEYWELL), the legacy graphics can be replaced with or migrated to modern Human Machine Interface (HMI) graphics in order to provide an enhanced user interface experience.

Image processing techniques exist to translate or migrate legacy graphics into modern HMI graphics. For example, U.S. patent application Ser. No. 15/953,072 (the contents of which are incorporated herein by reference) describes such techniques. However, characteristics of some legacy graphics objects inhibit full and comprehensive use of these existing techniques. For example, some legacy graphics objects (e.g., process lines representing process connections, instrument lines indicating the process taping or point of measurement, control connections, and the like) are composed of multiple repeated line segments and custom arrow heads (created by combining many line segments). These objects can be difficult to map or translate unless they are aggregated suitably as connections between objects. As another example, there are objects that are used in legacy graphics with little variation from the parent object in some of the instances of usage.

These gaps in mapping success bring down the translation efficiency and require manual labor to fix the translation gaps. Such manual effort can be expensive and does not allow the user to reap the full benefits of automated translation. Also, end users tend to view the translation as either a complete translation or an inferior partial translation, regardless of how close to complete the degree of translation may be. Hence, for user satisfaction, the translation should be total.

To address these and other issues, embodiments of this disclosure provide an object aggregation and standardization solution that substantially enhances migration efficiency. The disclosed embodiments apply analytics and image processing for grouping and identifying unique industrial objects, assets, or devices. These embodiments use analytics to aggregate repeated or lumped discrete elements to identify the elements as a single object. The embodiments then find the equivalent object in the new HMI graphics. Additionally, the embodiments also identify grouped objects and map them appropriately to an HMI shape.

The disclosed embodiments aggregate multiple repeated line segments or lines with an arrow head and replace the discrete objects with a single line object by applying its relevant properties for the direction indication. The disclosed embodiments identify the pattern using object coordinates. The disclosed embodiments categorize the pattern using clustering and decision tree algorithms. The disclosed embodiments create a library of unique industrial objects, devices, and assets using image processing. The uniqueness can be agnostic to associated text, size, and color.

The disclosed embodiments can be used as part of a graphics conversion for identifying assets and replacing with standard shapes from the HMI shape library. The identification can also be used for on-job competency analysis for identifying process flows across the assets. In some embodiments, one or more of the components in FIG. 1 (such as the operator consoles 110, the historian 114, or the server 116) could be configured to perform these operations.

The disclosed embodiments provide at least the following benefits for translation of industrial process graphics to a newer format:

Improved graphics migration accuracy and efficiency;
Improved user acceptance and usage levels;
Reduced migration effort;
Reduced cycle time and costs;
A pattern library that can grow over time and hence future configuration is reduced;
More automation and less manual engineering work;
Improved user experience with modern shapes;
Consistency among the graphics generated.

These benefits represent a technical advantage over conventional systems and other systems that do not provide adequate support for migration of complex legacy graphical objects. Additional details regarding the disclosed embodiments are provided below.

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment supporting objects aggregation and standardization for legacy graphics conversion. This functionality can be used in any other suitable system.

As discussed above, in custom graphics, groups of objects can be used to represent single objects or container objects. For example, to represent container objects like a tank, boiler, or furnace, a combination of primitive objects (e.g., rectangles, polygons, arcs, line segments, and the like) is often used. These combinations are unique in individual ways. These combinations can be of primitive objects alone or combination of primitive objects and embedded pictures.

In some industrial graphical displays, a process line for connection of objects is represented with repeated line segments or polygon objects. These can be represented in HMI as a single line and by setting its properties. The representations are typically different across sites as it depends on the engineering being performed.

In some conventional migration solutions, the graphical object conversions are done one to one. That is, the repeated line segments forming some objects are converted as multiple objects in HMI. Hence the number of objects is greater than necessary. In contrast, the disclosed techniques identify all instances of repeated and grouped objects, aggregate them, and replace the multiple objects with one relevant HMI object or shape.

By applying a few methodologies in sequence, the problem of static conversion can be addressed. These methodologies can include the following:

1. Aggregation logic for process lines to connect objects.
2. Form patterns using rules applied on object coordinates and extract the pattern in the image format. Retain these patterns in the global pattern library.
3. Apply image processing for uniqueness validation of the patterns.
4. Categorize the patterns as a particular type of object (e.g., tank, boiler, furnace, etc.) using clustering and decision tree algorithms.

Figure 2:
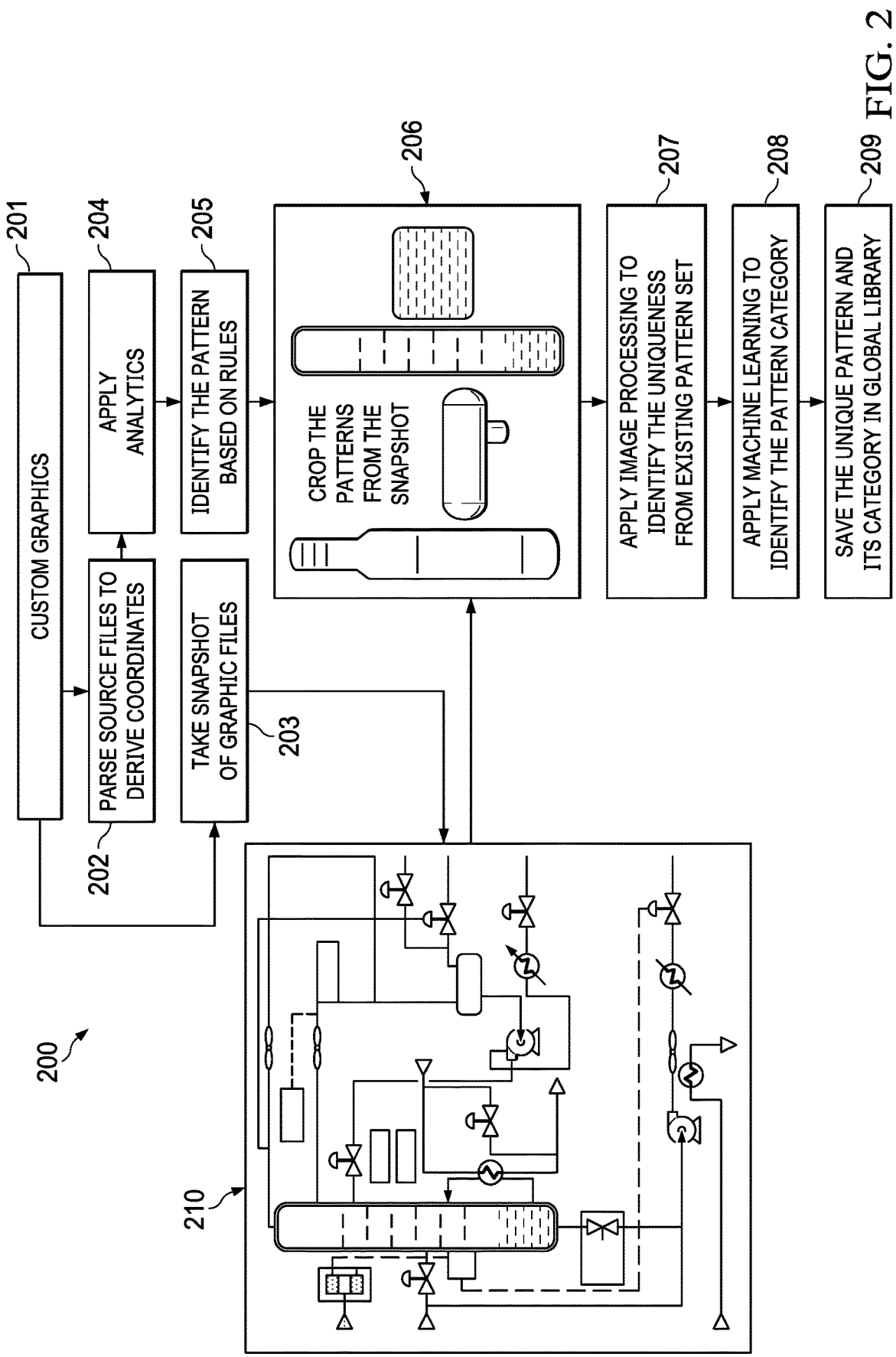
FIG. 2 illustrates an example method for objects aggregation and standardization for legacy graphics conversion according to this disclosure.

FIG. 2 illustrates an example method 200 for objects aggregation and standardization for legacy graphics conversion according to this disclosure. The method 200 could, for example, be used for translation of graphics that are displayed at one or more operator consoles 110 in the system 100 of FIG. 1. However, the method 200 could be used with any other suitable system. For ease of explanation, the method 200 may be described as being performed using a computing device (such as the device 1500 of FIG. 15 discussed below). The method 200 may be performed in an on-premise system, a cloud hosted system, or any other suitable system.

At block 201, custom graphics files from the legacy system are received as input to the process 200. The legacy graphics files are graphics files containing one or more legacy graphics objects for use in a legacy control system. Screen image 210 illustrates a graphic image of one legacy graphics file. In particular embodiments, the legacy graphics files are HONEYWELL US graphics files (having a *.DS file extension) or GUS graphics files (having a .PCT file extension). In some cases, as a preceding step, US (DS) graphics files are converted to the GUS file type. In order to improve the standardization results, many (e.g., hundreds) of legacy graphics files can be considered.

At block 202, the legacy graphics files are parsed to derive coordinates of primitive graphic objects (lines, arcs, polygons, etc.) in each legacy graphics file. This entails examining the raw data in the graphics files and parsing the raw data to determine what graphic objects are comprised in the graphic files. The raw data is also parsed to determine coordinates on the X and Y axes (e.g., the horizontal and vertical location on the display) of each primitive graphic object in the file. These coordinates are used when the graphic object is converted to the HMI format. During the conversion to HMI format, the graphic object may be resized to account for differences in resolution and aspect ratio between the legacy display and the HMI display. The graphic object can be placed in a corresponding location in the HMI display compared to the legacy display, while accounting for differences in resolution and aspect ratio.

At block 203, graphic snapshots are taken of the legacy graphics files. Each graphic snapshot represents a screen image that can be displayed using the legacy graphics files. For example, the screen image 210 can be one example of a graphic snapshot.

Figure 3:
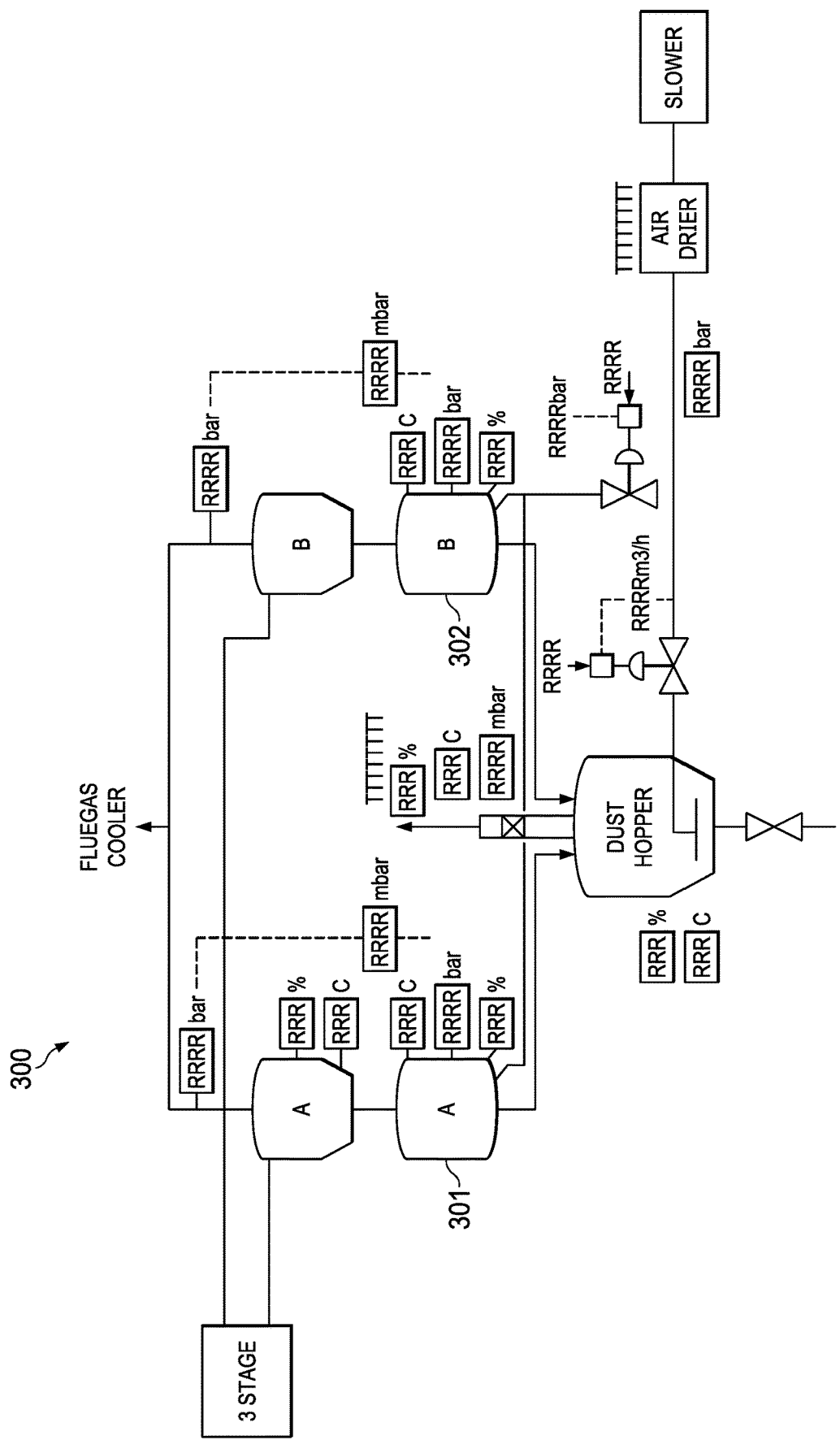
FIG. 3 shows a screen image from a legacy source graphics file.

At block 204, analytics are applied to determine relationships among the identified primitive graphic objects. In legacy graphics files, some primitive graphic objects (lines, arcs, polygons, etc.) are grouped together to form one single element, such as a tank, pump, or furnace. For example, FIG. 3 shows a screen image 300 from a legacy US or GUS source graphics file. The tanks 301-302 in the image 300 appear to be one cylindrical object. However, each tank 301-302 is stored in the graphics file as multiple primitive objects (e.g., a rectangle and four arcs).

An image generation algorithm is performed to determine one or more patterns among the identified primitive graphics objects. For example, a set of line segments can be a line, a set of four lines can be a rectangle, and a set of four arcs can be a circle. Analytics are applied to the graphics raw data to determine if groups of objects are related (e.g., do the objects touch, do the objects overlap, etc.). A clustering algorithm can be used for these analytics. Once it is determined that multiple objects form a group based on their relationships, a decision tree algorithm can be applied to determine what category the particular group of objects belongs to.

At block 205, patterns are identified based on one or more rules. In legacy graphics, to form container objects or to represent an asset, multiple primitive objects or embedded objects are grouped together in a pattern. Of course, an individual embedded object which is not grouped can also represent as asset. In HMI, these can be designed using a single object or a shape.

Identifying these combinations or patterns from the legacy graphics is not straightforward. This requires understanding of the objects being placed from the object coordinate system. Moreover, objects that overlap and form a group may be identified using an overlapped objects algorithm.

In legacy graphics, images of process connections are typically represented in one of the three cases described below:
  Case 1: Control connections are represented with a group of repeated lines that appear as a dashed line.
  Case 2: A process line is ended with a polygon object to have the appearance of an arrow head.
  Case 3: Multiple line segments are combined to form one process line.

In HMI, these cases are typically represented using a single line object. The conversion from legacy file to HMI file can be improved by first aggregating the multiple objects into a single object as described below. Decision tree and clustering algorithms can be performed on the objects' coordinates to achieve this.

Case 1: Repeated Line to Represent Dashed Line.

Figure 4A:
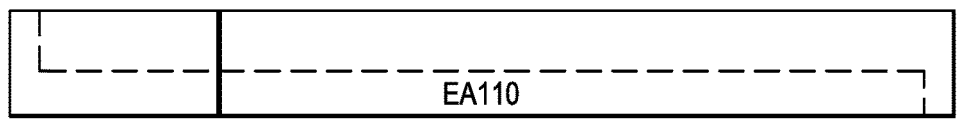
FIGS. 4A through 6B illustrate images of process connections.
Figure 4B:
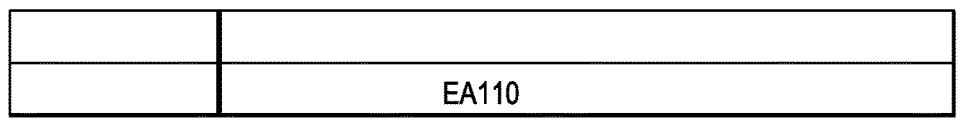

As shown in FIG. 4A, many smaller lines are repeated used in a legacy graphic to form a dashed line. In the case shown, the dashed line is in the horizontal direction. Using the direction (or orientation) of the lines and the incremental representation of the lines, these lines can be identified and formed as one continuous line, as shown in FIG. 4B.

Case 2: Arrow Headed Process Line

Figure 5A:
Figure 5B:
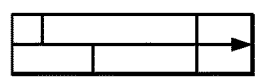

As shown in FIG. 5A, polygons can be placed at the end of some lines to represent an input or output flow. Based on the overlap of the line on the one edge of the polygon, these combinations can be identified. Then the line can be formed as an arrow-headed line by removing the polygon and replacing with an arrow shape, as shown in FIG. 5B.

Case 3: Multiple Lines for a Process Line

Figure 6A:
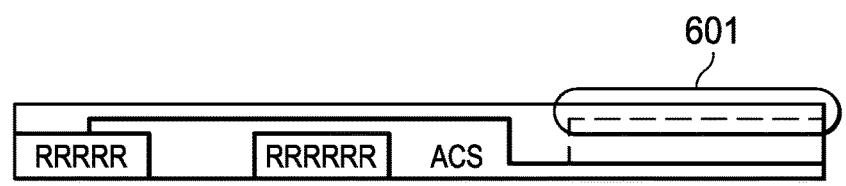
Figure 6B:
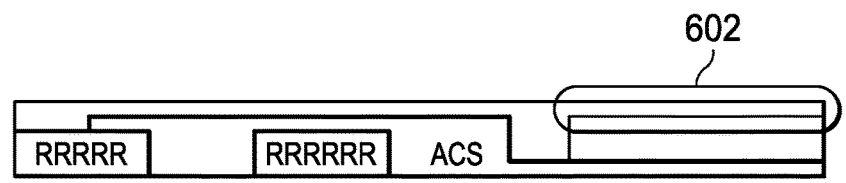

As shown in FIG. 6A, one single process connection is represented using multiple lines, as indicated at 601. Based on the endpoint overlap of the lines, these lines are identified and replaced with one polyline 602, as shown in FIG. 6B.

Figure 7:
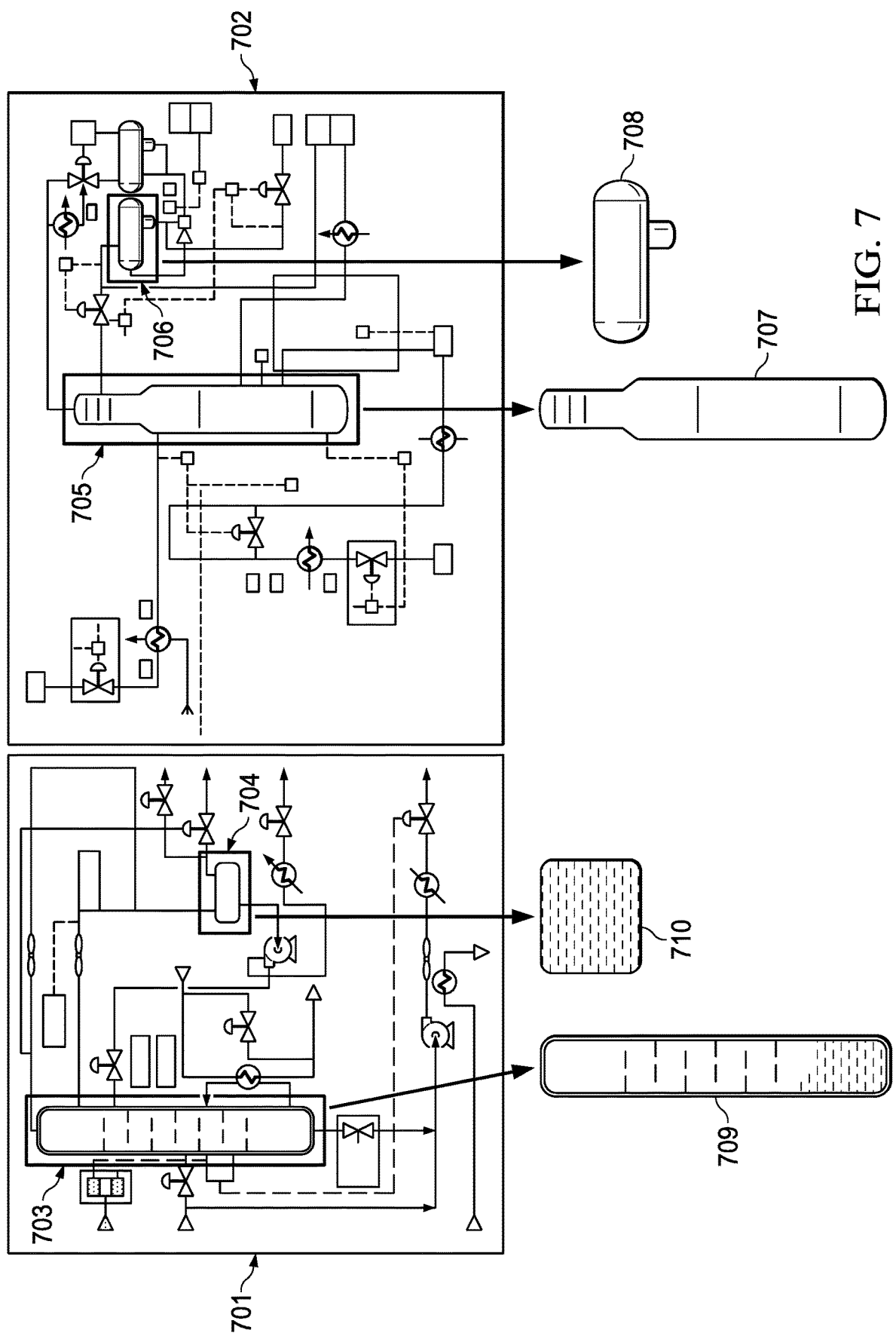
FIG. 7 illustrates multiple legacy graphic snapshots according to this disclosure.
Figure 8:
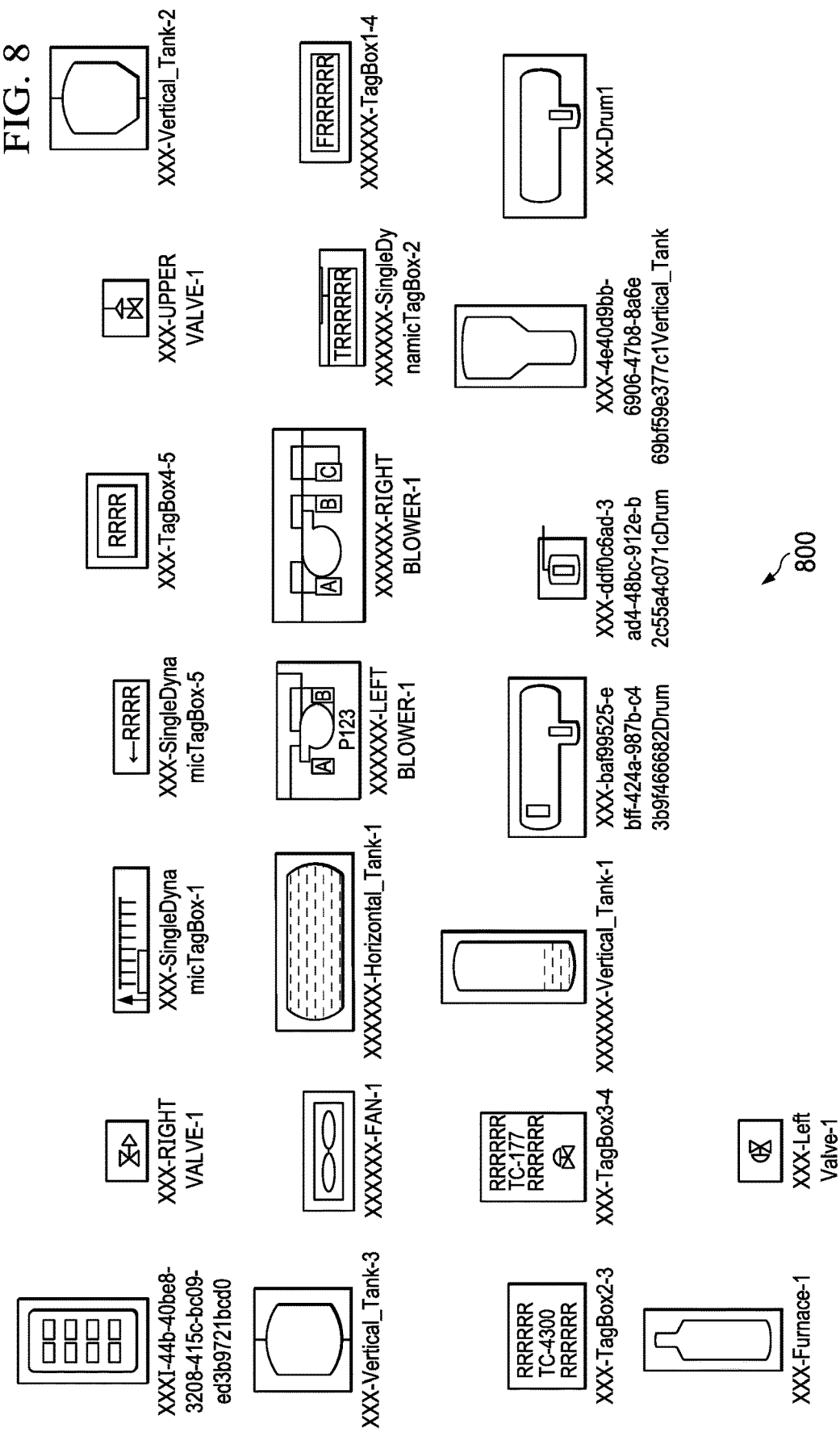
FIG. 8 illustrates a pattern library that contains multiple identified legacy patterns according to this disclosure.

At block 206, patterns are cropped from each legacy graphic snapshot. To improve recognition and identification of patterns, multiple legacy graphic snapshots are first examined and processed. For example, FIG. 7 illustrates two legacy graphic snapshots 701-702 according to this disclosure. The groups of primitive objects are identified in the graphic snapshots using the object coordinate system. For example, in FIG. 7, four groups of primitive objects 703-706 are identified in the graphic snapshots 701-702. Then these groups are cropped from the snapshots and identified as patterns. For example, FIG. 7 shows four patterns 707-710 cropped from the legacy graphic snapshots 701-702. Whenever a pattern is identified, the new pattern is compared with an existing library of patterns using an image processing algorithm. For example, FIG. 8 illustrates a pattern library 800 that contains multiple identified legacy patterns, including tanks, valves, blowers, furnaces, tag boxes, and the like. This comparison can be agnostic to rotation/scaling and threshold factors. Whenever a new pattern is identified, the new pattern is categorized and added to the pattern library 800. This process helps to ensure that a complete set of patterns is built and that the categorization to HMI shapes is streamlined.

The following describes two example scenarios for identification and cropping of objects.

1. Overlapped Objects Identification and Cropping:

In this scenario, the objective is to determine whether the objects have any endpoint connections. For any asset that has been created, the asset should have started with a container object, e.g., a rectangle or a polygon. To identify the group of objects, the following sequence is performed:
  Consider the base object as a rectangle or polygon.
  Take the endpoints of the rectangle and determine if any other object is positioned adjacent to the rectangle.
  From the group of objects identified, get the left, right, top and bottom edge points.
  Using this information, from the snapshot taken from the file, crop this as the pattern.

2. Individual Embedded Objects Identification and Cropping:

In this scenario, the objective is to identify the embedded objects that are individually placed. To identify these embedded objects, the following sequence is performed:
  Exclude all the embedded objects that are already identified as overlapped objects.
  Take the endpoints of the embedded object and determine if any other object is positioned adjacent to the embedded object.
  If no adjacent object is identified, then identify the embedded object as an individual object and get the left, right, top and bottom edge points.
  Using this information, from the snapshot taken from the file, crop this as the pattern.

The following section describes the identification and categorization of certain groups of objects.

Figure 9:
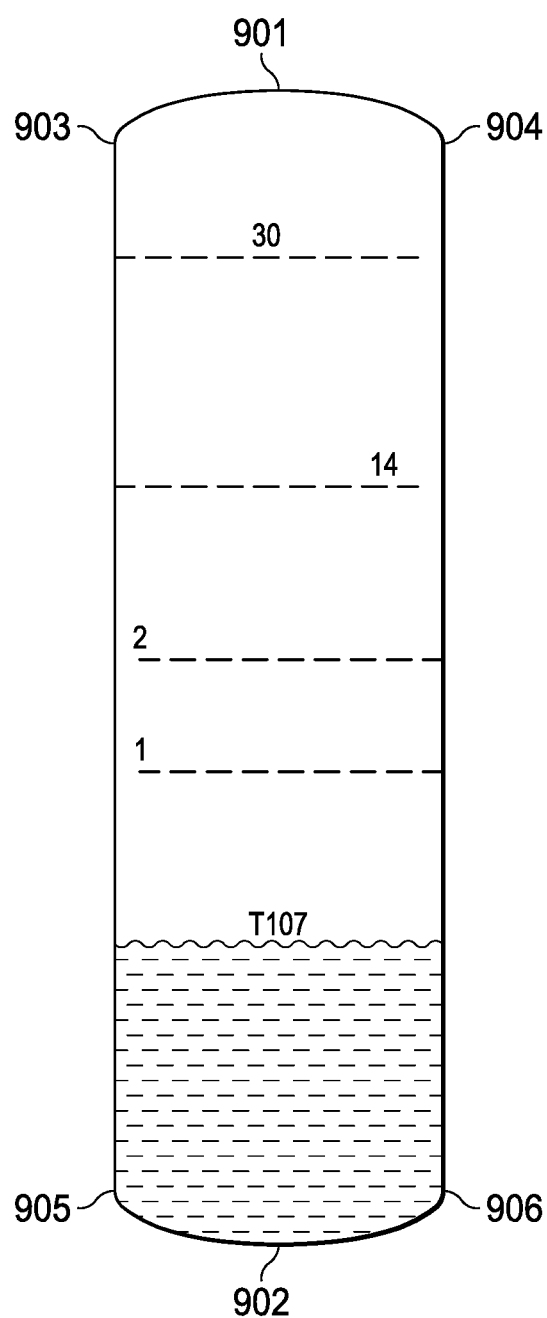
FIG. 9 illustrates an example of identifying a tank category according to this disclosure.

FIG. 9 illustrates an example of identifying a tank category according to this disclosure. In some embodiments, there can be two different tank formations, horizontal and vertical. When a group of objects is identified, the following operations and rules are performed on the objects of the group to determine that the group of objects is a tank.

1. Determine each of the objects and the endpoints of each object. For example, in FIG. 9, two arc objects 901-902 are determined and the endpoints 903-906 of the arc objects 901-902 are determined.

2. Get the maximum and minimum coordinates of the overall object group. For example, determine the left, top, right, and bottom edges of the object group.

3. Derive the dimensions from these coordinates. For example, derive the width and height of the object group.

4. Based on the height and width, determine whether the dimensions form a rectangular area.

5. If the height is more than the width, it implies that the object group is a vertical tank. For example, FIG. 9 shows a vertical tank that is taller than it is wide. If the width is more than the height, it implies that the object group is a horizontal tank.

Figure 10:
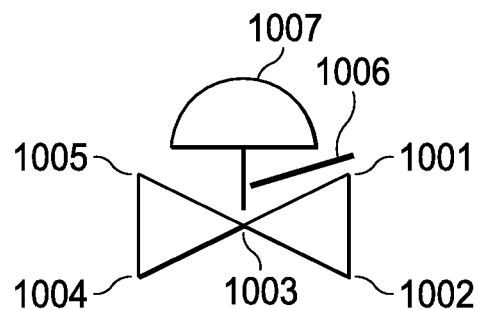
FIGS. 10 and 11 illustrate examples of identifying a valve category according to this disclosure.
Figure 11:
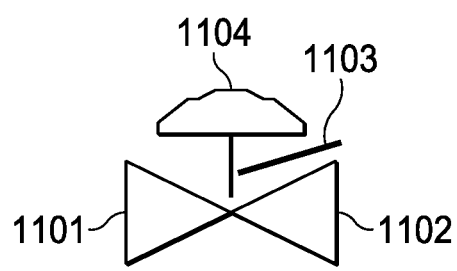

FIGS. 10 and 11 illustrate examples of identifying a valve category according to this disclosure. Typically, a valve is represented in the legacy graphics using a combination of primitive objects, such as one or more polygons, lines, and arcs. The following scenarios are identified, and the following rules and operations are applied on the objects of the embedded picture to determine that the group of objects is categorized as a valve.

Scenario 1 (FIG. 10):
1. Identify a polygon that has five points 1001-1005.
2. Get the lines of the polygon and identify the intersecting point 1003.
3. Identify a line 1006 starting from the intersecting point 1003.
4. Identify an arc 1007 at the endpoint of the line 1006.

Scenario 2 (FIG. 11):
1. Identify two polygons 1101-1102 that overlap at one end of each.
2. Identify a line 1103 starting from the point where the polygons 1101-1102 intersect.
3. Identify an arc 1104 at the endpoint of the line 1103.

Figure 12:
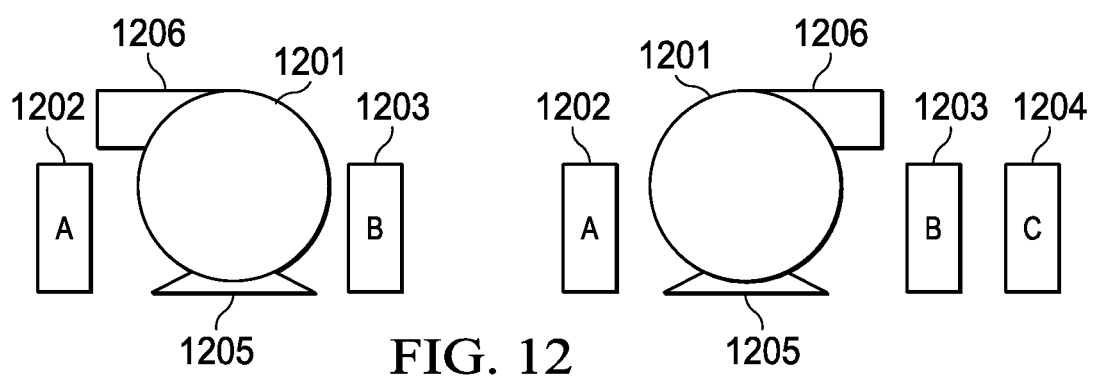
FIG. 12 illustrates examples of identifying a blower category according to this disclosure.

FIG. 12 illustrates examples of identifying a blower category according to this disclosure. Typically, a blower is represented in the legacy graphics using a combination of primitive objects, such as one or more ellipses, polygons, and rectangles. Also, the direction of the nozzle of the blower can be left or right. FIG. 12 shows examples of both a left blower and a right blower. The following rules and operations are applied on the objects of the embedded picture to determine that the group of objects is categorized as a blower.

1. Identify an ellipse 1201 forming the base of the blower.
2. Determine the positions of one or more polygons or rectangles 1202-1204 adjacent to the ellipse 1201.
3. Identify a polygon 1205 that intersects both bottom quadrants of the ellipse 1201.
4. If the ellipse 1201 is not applied with fill, it should be occupied with filled polygons or rectangles.
5. Identify one polygon or rectangle 1206 that overlaps the ellipse 1201 at one of the top quadrants of the ellipse 1201.

6. If the polygon or rectangle 1206 is identified in the left top quadrant, then the nozzle is on the left, and the blower is a left blower.
7. If the polygon or rectangle 1206 is identified in the right top quadrant, then the nozzle is on the right, and the blower is a right blower.

At block 207, image processing is performed to identify unique patterns from the existing pattern set. Any suitable imaging processing techniques can be used, including currently known techniques and techniques developed in the future. For example, the image processing techniques described in U.S. patent application Ser. No. 15/953,072 can be used for identifying the unique patterns.

Figures 13, 14:
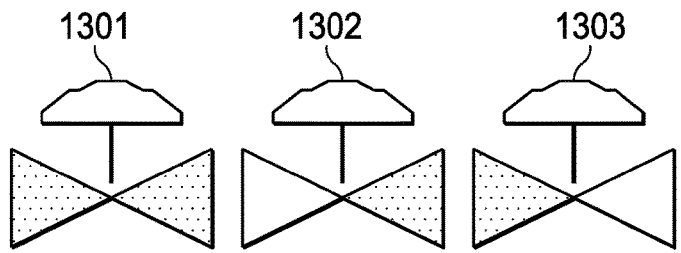
FIG. 13 illustrates different valves that are all categorized to one HMI valve shape according to this disclosure.
FIG. 14 illustrates a mapping between legacy source patterns and corresponding HMI shapes.

To identify the unique patterns, variances between different objects based on appearance are identified. For example, while two objects may have a similar appearance, they may differ in size, may differ in orientation, or may differ in the text that is associated with the object. However, the different objects may be categorized as a single pattern category (e.g., right facing valve, vertical tank, tag box, etc.). When the legacy objects are replaced with the corresponding HMI shape, these variances are applied on the individual objects of the shape to retain the identity of the objects. For example, FIG. 13 illustrates different valves 1301-1303 that are all categorized to one HMI valve shape. However, the variances between the respective instances are applied with the variances in the HMI graphic.

At block 208, machine learning is applied to identify a pattern category associated with the pattern. There can be many (e.g., 45 to 50) high level categories. In addition, there are subsets within each category. Thus, machine learning can be implemented to find objects that look similar across multiple files, determine that they are the same object, and replace the similar objects with a same standardized object. All of the groups or patterns derived previously are considered to identify the category of shapes. By performing clustering and decision tree algorithms, these patterns can be categorized as a particular category (e.g., tank, boiler, furnace, valve, etc.).

At block 209, each unique pattern and its category are saved in the pattern library. Once categorization is performed, each pattern is associated with a shape from the HMI library. For example, FIG. 14 shows a mapping 1400 between legacy source patterns and corresponding HMI shapes. The mapping 1400 may be associated with, or included in, the pattern library.

Once all of the custom templates from the input file have been retrieved, based on the clustering algorithm and the grouping techniques, and considering alignment and orientation (or direction), the templates are grouped or categorized into respective categories, which are used for the HMI shape. For example, a file can be identified and categorized as a right valve, a vertical tank, a certain type of tag box, or the like. This is then converted to an HMI shape. The graphical representation of the HMI shape can be previewed to the user using a preview feature. The preview feature allows for resizing and realignment of the shape in the HMI display, if needed. In some embodiments, the algorithm can adapt the HMI shape to accommodate screen or display aspect ratios or resolutions that have changed from the legacy system to the HMI system.

Although FIG. 2 illustrates one example of a method 200 for objects aggregation and standardization for legacy graphics conversion, various changes may be made to FIG. 2. For example, while shown as a series of steps, various steps shown in FIG. 2 could overlap, occur in parallel, occur in a different order, or occur multiple times. Moreover, some steps could be combined or removed and additional steps could be added according to particular needs.

Figure 15:
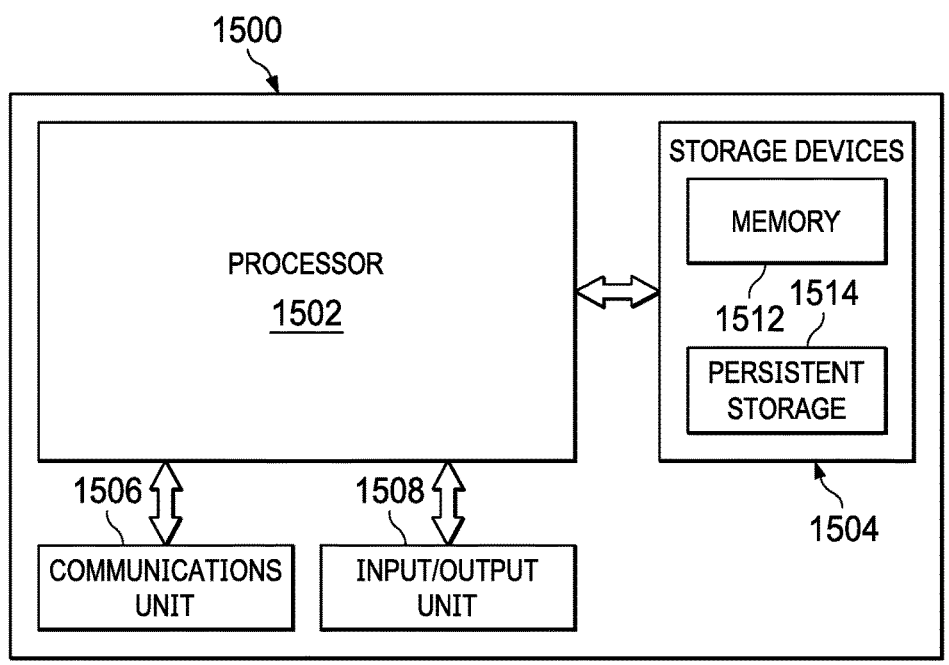
FIG. 15 illustrates an example device supporting objects aggregation and standardization for legacy graphics conversion according to this disclosure.

FIG. 15 illustrates an example device 1500 supporting objects aggregation and standardization for legacy graphics conversion according to this disclosure. The device 1500 could, for example, represent the operator consoles 110, the historian 114, or the server 115 of FIG. 1. However, these components could be implemented using any other suitable device or system, and the device 1500 could be used in any other suitable system.

As shown in FIG. 15, the device 1500 includes at least one processor 1502, at least one storage device 1504, at least one communications unit 1506, and at least one input/output (I/O) unit 1508. Each processor 1502 can execute instructions, such as those implementing the processes and methods described above that may be loaded into a memory 1512. Each processor 1502 denotes any suitable processing device, such as one or more microprocessors, microcontrollers, digital signal processors, application specific integrated circuits (ASICs), field programmable gate arrays (FPGAs), or discrete circuitry.

The memory 1512 and a persistent storage 1514 are examples of storage devices 1504, which represent any structure(s) capable of storing and facilitating retrieval of information (such as data, program code, and/or other suitable information on a temporary or permanent basis). The memory 1512 may represent a random access memory or any other suitable volatile or non-volatile storage device(s). The persistent storage 1514 may contain one or more components or devices supporting longer-term storage of data, such as a read only memory, hard drive, Flash memory, or optical disc. The memory 1512 or the persistent storage 1514 may be configured to store information and data associated with objects aggregation and standardization for legacy graphics conversion in a process control and automation system.

The communications unit 1506 supports communications with other systems or devices. For example, the communications unit 1506 could include a network interface card or a wireless transceiver facilitating communications over a wired or wireless network (such as the network 108). The communications unit 1506 may support communications through any suitable physical or wireless communication link(s).

The I/O unit 1508 allows for input and output of data. For example, the I/O unit 1508 may provide a connection for user input through a keyboard, mouse, keypad, touchscreen, or other suitable input device. The I/O unit 1508 may also send output to a display, printer, or other suitable output device.

Although FIG. 15 illustrates one example of a device 1500 supporting objects aggregation and standardization for legacy graphics conversion, various changes may be made to FIG. 15. For example, various components in FIG. 15 could be combined, further subdivided, or omitted and additional components could be added according to particular needs. Also, computing devices can come in a wide variety of configurations, and FIG. 15 does not limit this disclosure to any particular configuration of computing device.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of using a computing device configured to facilitate migration of objects from a legacy control system or version of control system to a new control system or version of control system, the method comprising:

receiving a plurality of legacy graphics files associated with a legacy control system for an industrial process, each legacy graphics file comprising a plurality of legacy graphics objects;

parsing the legacy graphics files to identify primitive graphic objects in each legacy graphics file;

determining relationships among the identified primitive graphic objects to determine a group of primitive graphic objects that form one component of the industrial process;

determining when one or more patterns among the identified primitive graphic objects in the group of primitive graphic objects that form one component of the industrial process represent one or more new patterns that are not already in a pattern library stored in a memory of the computing device; and saving the one or more new patterns along with an associated pattern category in the pattern library.

2. The method of claim 1, wherein the pattern library includes a mapping between each pattern of the one or more patterns and a corresponding shape in a target graphics file.

3. The method of claim 2, wherein the target graphics file is associated with a newer version of the control system.

4. The method of claim 1, further comprising:
cropping the one or more patterns from the legacy graphics files; and
identifying a pattern category for each of the one or more patterns.

5. The method of claim 4, wherein identifying the pattern category for each of the one or more patterns comprises categorizing each pattern as a particular type of object using clustering and decision tree algorithms.

6. The method of claim 1, wherein parsing the legacy graphics files comprises determining coordinates on X and Y axes of each primitive graphic object in the legacy graphics files.

7. The method of claim 1, further comprising:
aggregating repeated or lumped discrete objects to identify the objects as a single object.

8. The method of claim 7, wherein aggregating the repeated or lumped discrete elements comprises:
aggregating multiple repeated line segments or lines with an arrow head and replacing the discrete objects with a single line object.

9. The method of claim 1, wherein the primitive graphics objects comprise at least one of:
a group of repeated lines that appear as a dashed line for a control connection;
a line and a polygon that appear as an arrow head; and
multiple line segments that are combined to form one process line.

10. An apparatus configured to facilitate migration of objects from a legacy control system or version of control system to a new control system or version of control system comprising:
at least one processing device configured to:
receive a plurality of legacy graphics files associated with a legacy control system or version of control system for an industrial process, each legacy graphics file comprising a plurality of legacy graphics objects;
parse the legacy graphics files to identify primitive graphic objects in each legacy graphics file;
determine relationships among the identified primitive graphic objects to determine a group of primitive graphic objects that form one component of the industrial process;
determine when one or more patterns among the identified primitive graphic objects in the group of primitive graphic objects that form one component of the industrial process represent one or more new patterns that are not already in a pattern library stored in a memory of the at least one processing device;
save the one or more new patterns along with an associated category in the pattern library; and
associate each new pattern of the one or more new patterns to a corresponding shape in a target graphics file associated with a new control system or version of control system.

11. The apparatus of claim 10, wherein the at least one processing device is further configured to:
crop the one or more patterns from the legacy graphics files; and
identify a pattern category for each of the one or more patterns.

12. The apparatus of claim 11, wherein to identify the pattern category for each of the one or more patterns, the at least one processing device is configured to categorize each pattern as a particular type of object using clustering and decision tree algorithms.

13. The apparatus of claim 10, wherein to parse the legacy graphics files, the at least one processing device is configured to determine coordinates on X and Y axes of each primitive graphic object in the legacy graphics files.

14. The apparatus of claim 10, wherein the at least one processing device is further configured to:
aggregate repeated or lumped discrete objects to identify the objects as a single object.

15. The apparatus of claim 14, wherein to aggregate the repeated or lumped discrete elements, the at least one processing device is configured to:
aggregate multiple repeated line segments or lines with an arrow head and replace the discrete objects with a single line object.

16. The apparatus of claim 10, wherein the primitive graphics objects comprise at least one of:
a group of repeated lines that appear as a dashed line for a control connection;
a line and a polygon that appear as an arrow head; and
multiple line segments that are combined to form one process line.

17. A non-transitory computer readable medium containing instructions that when executed cause at least one processing device to:
receive a plurality of legacy graphics files associated with a legacy control system for an industrial process, each legacy graphics file comprising a plurality of legacy graphics objects;
parse the legacy graphics files to identify primitive graphic objects in each legacy graphics file;
determine relationships among the identified primitive graphic objects to determine a group of primitive graphic objects that form one component of the industrial process;
determine when one or more patterns among the identified primitive graphic objects in the group of primitive graphic objects that form one component of the industrial control process represent one or more new patterns that are not already in a pattern library stored in a memory of the computing device; and
save the one or more new patterns along with an associated pattern category in the pattern library.

18. The non-transitory computer readable medium of claim 17, wherein the pattern library includes a mapping between each pattern of the one or more new patterns and a corresponding shape in a target graphics file.

* * * * *